United States Patent
Nakayama

(10) Patent No.: US 7,158,184 B2
(45) Date of Patent: Jan. 2, 2007

(54) DIGITAL STILL CAMERA WITH IMAGE DISPLAY DEVICE ARRANGED ON SIDE OF IMAGING DEVICE

(75) Inventor: Haruki Nakayama, Tokyo (JP)

(73) Assignee: Konica Corporation, Tokyo (JP)

( * ) Notice: Subject to any disclaimer, the term of this patent is extended or adjusted under 35 U.S.C. 154(b) by 738 days.

(21) Appl. No.: 10/318,776

(22) Filed: Dec. 12, 2002

(65) Prior Publication Data
US 2003/0117524 A1   Jun. 26, 2003

(30) Foreign Application Priority Data
Dec. 21, 2001   (JP)   ............... 2001-389794

(51) Int. Cl.
*H04N 5/225* (2006.01)
(52) U.S. Cl. .................. 348/375; 348/333.01
(58) Field of Classification Search ............ 348/375, 348/373, 374, 333.01
See application file for complete search history.

(56) References Cited

U.S. PATENT DOCUMENTS 6,101,339 A * 8/2000 Miki et al. ............... 396/301
6,243,155 B1 * 6/2001 Zhang et al. ............. 349/199
6,434,331 B1 * 8/2002 Araoka et al. ............ 396/72

* cited by examiner

*Primary Examiner*—Vivek Srivastava
*Assistant Examiner*—Gevell Selby
(74) *Attorney, Agent, or Firm*—Cohen, Pontani, Lieberman & Pavane

(57) ABSTRACT

A digital still camera, composed of
 a lens barrel having therein a camera lens, whose optical axis is close to a center of the digital still camera,
 an imaging element arranged on an image forming point of the camera lens, perpendicularly to the optical axis of the camera lens, for receiving an image of a subject taken through the camera lens, and
 an image display device arranged on a side of the imaging element, on a back side of the digital still camera, for displaying the image taken by the imaging element through the camera lens,
 wherein a concave section for housing one side portion of the image display device is formed in the lens barrel from a peripheral surface of the lens barrel to an inside of the lens barrel, perpendicularly to the optical axis.

1 Claim, 3 Drawing Sheets

DIGITAL STILL CAMERA WITH IMAGE DISPLAY DEVICE ARRANGED ON SIDE OF IMAGING DEVICE

BACKGROUND OF THE INVENTION

The present invention relates to a digital still camera, and more particularly, to a digital still camera having, on its back side, an image display device composed of an LCD monitor for an image display.

In the digital still camera, there is generally provided the image display device composed of LCD (liquid crystal display) monitor, so that it is on the back side of the camera main body, in order to recognize extemporaneously an image of a subject (a through image) that is taken through a camera lens, an image that is taken immediately after photographing the subject by a depressing operation of a release switch, and a reproduced image of the image that is photographed and recorded.

In order to design the digital still camera to be thin, it is important how to arrange each of constituent parts provided in the camera main body. Usually, the camera lens is composed of a lens group that is composed of a plurality of lenses, and housed in a cylindrical lens barrel to be housed in the camera main body, further, the image display device is housed on the camera main body so that a surface of the image display device is on the back side of the camera main body, however, they occupy a space so large that an arrangement relation between them becomes a large factor for the determination of the thickness of the camera.

FIG. 3 and FIG. 4 are inside structural drawings showing the arrangement relations between the lens barrel and the image display device on the usual digital still camera. Here, there are shown the conditions of the camera viewed from its bottom side.

In the lens barrel 11, there is formed concave section 11a on the center of the back end side (the lower side in the drawing) of it, and imaging element 12 represented by CCD (charge coupled device) is housed in the concave section 11a. Incidentally, the lens group composed of a plurality of lenses is housed in the lens barrel 11, which is not illustrated.

In the case that image display device 13 is arranged on the left side (right side in the drawing) of the lens barrel 11, viewed from the back side of the camera main body 10 shown in FIG. 3, the lens barrel 11 is arranged coming up to the right side (grip side: left side in the drawing) of center line C of the camera 10 so that it is difficult to grip the camera main body 10. Due to this, in the case that the image display device 13 is arranged on the higher or lower side of the lens barrel 11, not on the left or right side, the camera becomes higher in height, which is different from a style that is long from side to side, or an original style of the camera, and whichever case may be taken, the lens barrel 11 is away from the center line C of the camera main body 10, causing the impossibility of an orthodox camera design. Further, in the case that the lens barrel 11 is away from the center line C of the camera main body 10, when the camera main body 10 is formed to have an outside appearance in which the center of the camera main body 10 is bulged mostly to be a curved surface, the thickness of the camera main body 10 becomes greater, which is a problem.

On the other hand, as shown in FIG. 4, in the case that the image display device 13 is arranged behind the lens barrel 11, it is possible to arrange the lens barrel 11 in the vicinity of the center of the camera main body 10, however the thickness of the camera main body 10 becomes greater than a sum of the thickness of the lens barrel 11 and the image display device 13, resulting in that the camera has a larger thickness. In this case, to design the camera to be thin, it is necessary to take measure that a print circuit board on which the imaging element 12 is attached is made of a thin FPC (flexible print circuit) board, however, there is a limit for designing the camera thinner, further, when the print circuit board is made of the FPC board, the imaging element 12 easily comes under the influence of noise of back light that is used in the image display device 13, which influences the image quality of the image which is photographed, that is a problem.

SUMMARY OF THE INVENTION

The subject of the present invention is to provide the digital still camera that can be thin and perform a simplification of the structure of the main body, even when the lens barrel is arranged in the vicinity of the center of the camera main body.

Structure 1 that can solve the above-mentioned subject is a digital still camera, having therein, a lens barrel having therein a camera lens, whose optical axis is close to a center of the digital still camera, an imaging element arranged on an image forming point of the camera lens, perpendicularly to the optical axis of the camera lens, for receiving an image of a subject taken through the camera lens, and an image display device arranged on a side of the imaging element, on a back side of the digital still camera, for displaying the image taken by the imaging element through the camera lens, wherein a concave section for housing one side portion of the image display device is formed in the lens barrel from a peripheral surface of the lens barrel to an inside of the lens barrel, perpendicularly to the optical axis.

Structure 2 is the digital still camera described in Structure 1 wherein a depth of a housing section in an optical axial direction of the lens barrel is nearly equal to a thickness of the image display device.

Structure 3 is the digital still camera described in Structure 1, wherein the one side portion of the image display device is housed in the concave section.

DETAILED DESCRIPTION OF THE PREFERRED EMBODIMENT

Figure 1:
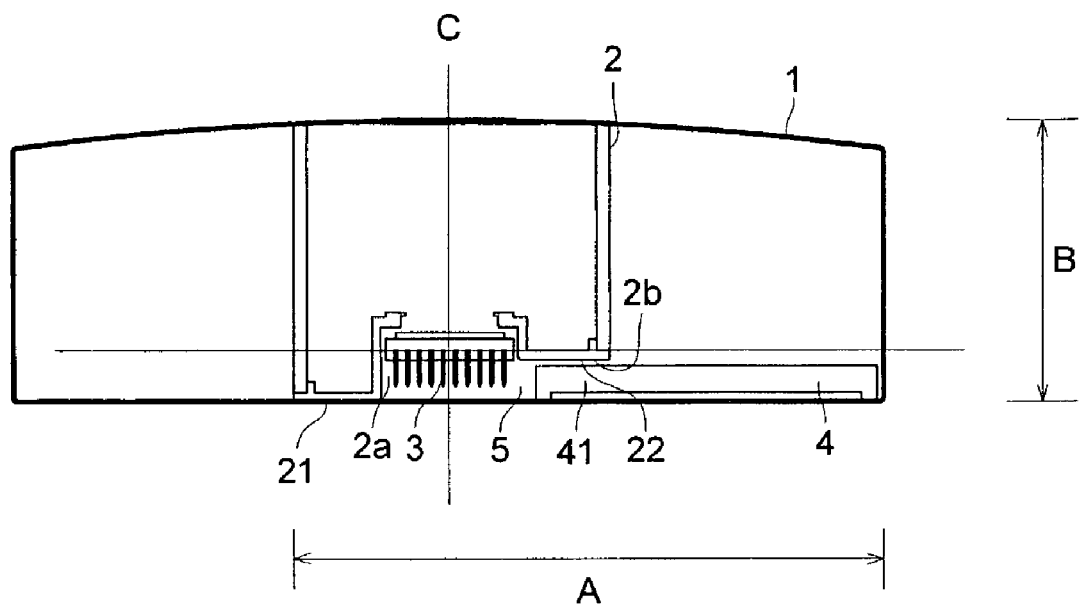
FIG. 1 is an inside structural drawing showing the arrangement relation between a lens barrel and an image display device of the digital still camera relating to the present invention, viewed from its bottom side.

Preferred embodiment of the present invention will be described in detail below, referring to the drawings.

Figure 2:
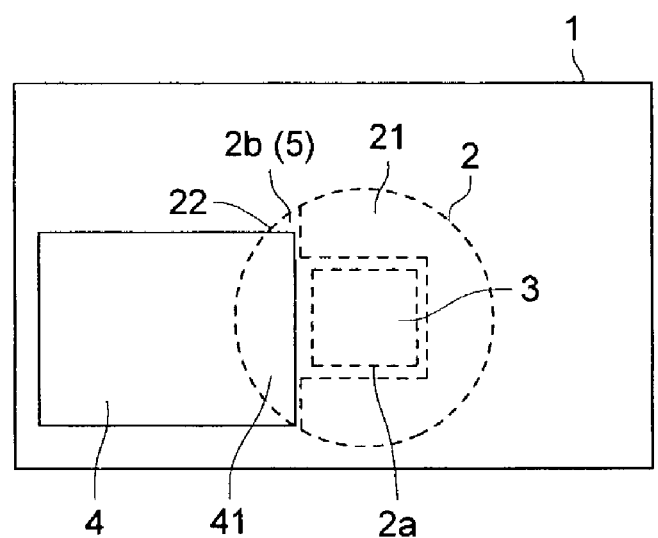
FIG. 2 is a schematic structural drawing of the digital still camera relating to the present invention, viewed from a back side.

FIG. 1 is an inside structural drawing showing the arrangement relation between a lens barrel and an image display device of the digital still camera relating to the present invention, viewed from its bottom side, and FIG. 2 is a schematic constructional drawing of the digital still camera relating to the present invention, viewed from a back side.

In a vicinity of the center of the camera main body 1, the lens barrel 2 which houses an unillustrated lens group is arranged so that the optical axis of the lens is nearly superposed on central line C (see FIG. 1) of the camera main body 1.

The lens barrel 2 is formed to be nearly cylindrical, and in its back end (the back side of the camera main body 10, lower side in FIG. 1), concave section 2a is formed on the center. The imaging element 3, narrower than an external diameter of the lens barrel 2, is arranged to be housed in the concave section 2a of the lens barrel 2. Due to this, the image of the subject that is taken by the unillustrated lens group in the lens barrel 2 is formed on an imaging surface of the imaging element 3.

Incidentally, the imaging element 3 is composed of an imaging section wherein there are provided a large number of pixels which constitute an imaging surface for photographing the image of the subject a housing that houses the imaging section, and a large number of electrodes projected from the housing, and in the present specification, the imaging element 13 means the one which includes all of the imaging section, the housing and the electrodes.

On back end face 21 of the lens barrel 2 and near the side of the imaging section 3, there is provided step section 2b that is recessed to the forward side (upper side in FIG. 1) of the camera main body 1 from a rearmost section of the imaging element 3, and due to this, in the step portion 2b, there is formed housing section 5 for housing one side section 41 of the image display device 4, between the back end face 22 of the lens barrel 2 and the near side of the imaging element 3.

In order to make the thickness of the camera main body 1 to be thinner as far as possible, it is preferable that the depth of the housing section 5 in the optical axial direction of the lens barrel 2 is set to be nearly equal to the thickness of the image display device 4.

Incidentally, though there is shown the housing section 5 which is formed on a portion of the back end face 21 of the lens barrel 2 here, the housing section 5 can be the one which is formed on a full area of the back end face 21 of the lens barrel 2, if the housing section 5 can house one side section 41 of the image forming device 4 between the back end face 21 of the lens barrel 2 and the side section of the imaging element 3.

Figure 3:
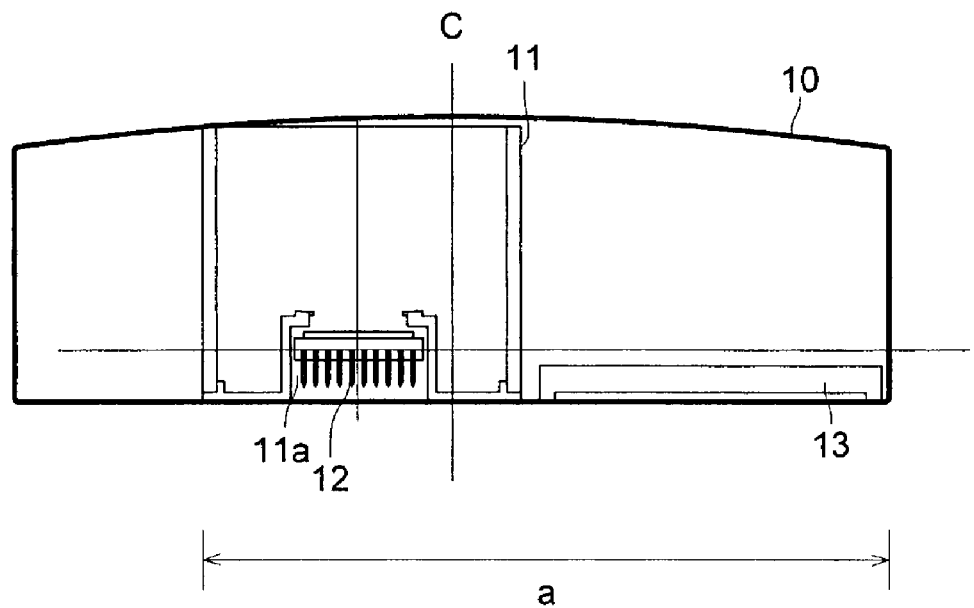
FIG. 3 is an inside structural drawing showing an arrangement relation between a lens barrel and an image display device of the usual digital still camera, viewed from a bottom side.
Figure 4:
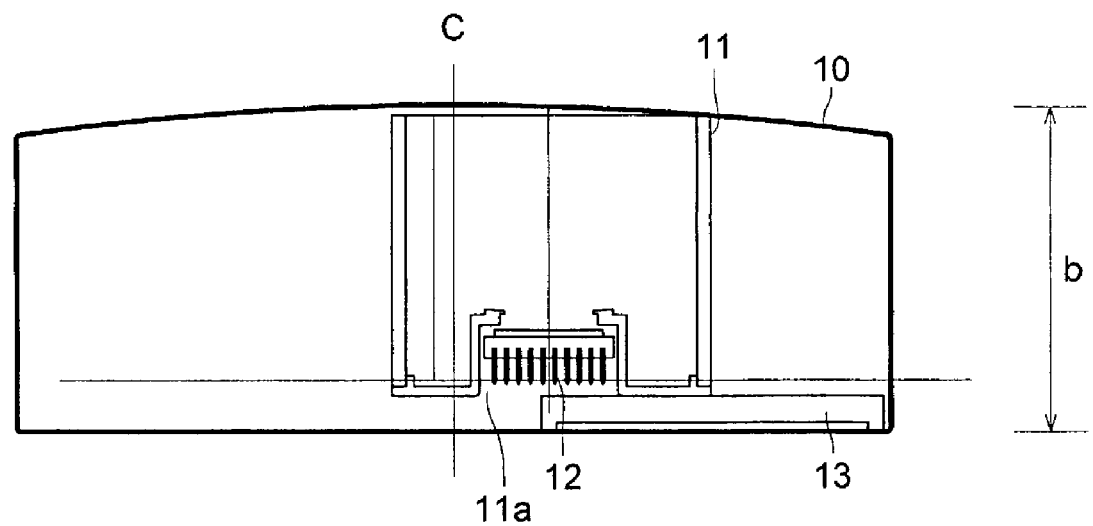
FIG. 4 is an inside structural drawing showing an arrangement relation between a lens barrel and an image display device of the conventional digital still camera, viewed from a bottom side.

The image display device 4 is composed of LCD monitor, whose display surface is provided to be on the back side of the camera main body 1, and its one side section 41 is arranged to be housed in the housing section 5 in the camera main body 1. Due to this, width A of the space which is occupied by the lens barrel 2 and the image display device 4 in the camera main body 1 is smaller than width a shown in FIG. 3, and it is possible to arrange the lens barrel 2 to be closest possible to the center of the camera main body 1. At the same time, the thickness B of the space which is occupied by the lens barrel 2 and the image display device 4 in the camera main body 1 is thinner than thickness b shown in FIG. 4, accordingly, even when the lens barrel 2 is arranged in the vicinity of the center of the camera main body 1, the thickness of the camera main body 1 is sufficiently thin.

Accordingly, in spite of a thin type, space for a grip can be secured sufficiently on the side of the lens barrel 2, and there is no case that the image display device 4, having lower stiffness, receives an external force from the back side of the camera main body 1 to the imaging element 3, because the image display device 4 is not arranged behind the imaging element 3. Due to this, there is no need to provide a special construction to keep the stiffness around the imaging element 3, a complication of the construction of the body is not caused.

Further, in the present invention, since a room for measurements that can be used for the connecting process of the electricity on the back of the imaging element 3 is larger than the thickness of the image display device 4, it is possible to use the circuit board, having a high shielding effect against the noise, for the circuit board on which the imaging element 3 is attached, which can decrease the influence that is exerted on the imaging element 3 by the noise generated from the back-light used in the image display device 4, and can generate the image having few deterioration of the image quality.

Figure 5:
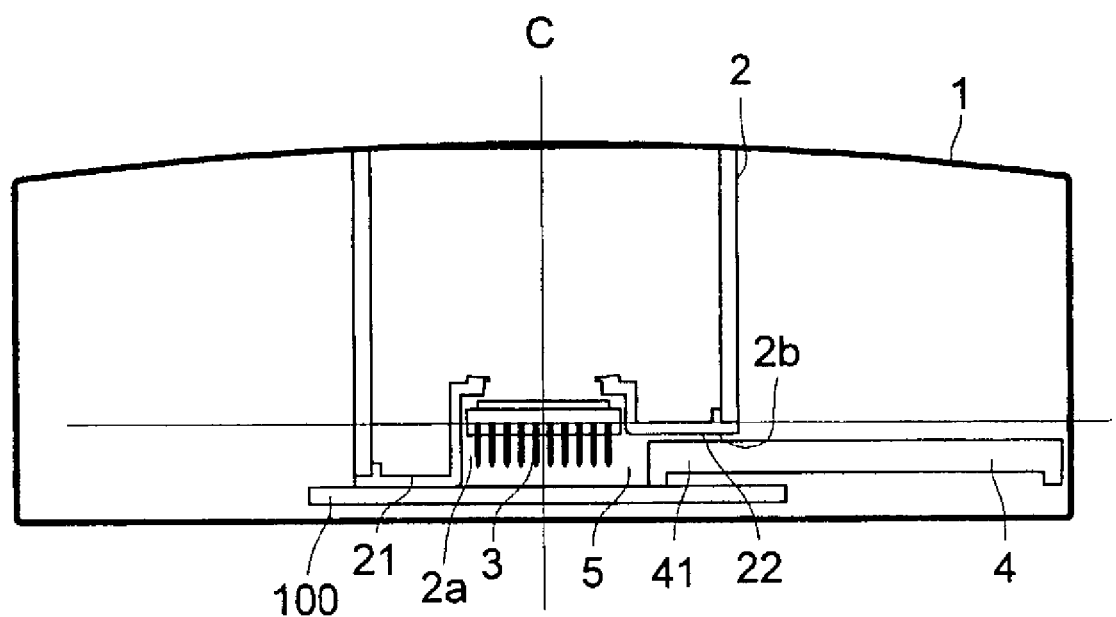
FIG. 5 is an inside structural drawing showing the arrangement relation among a lens barrel, a circuit board and an image display device of the digital still camera relating to the present invention, viewed from its bottom side.

Incidentally, when circuit board 100 attached on the imaging element 3 has an area larger than the imaging element 3, as shown in FIG. 5, it is possible to arrange the image display device 4 in the space between the circuit board 100 and the rear section of the lens barrel 2.

The present invention can provide the digital still camera which has the thin construction and the simplification of the construction of the body, even though the lens barrel is arranged in the vicinity of the center of the camera main body.

What is claimed is:

1. A digital still camera, comprising:
   a lens barrel having therein a camera lens with an optical axis which is located close to a center of the digital still camera;
   an imaging element arranged on an image forming point of the camera lens, perpendicularly to the optical axis of the camera lens, for receiving an image of a subject taken through the camera lens; and
   an image display device arranged on a side of the imaging element, on a back side of the digital still camera, for displaying the image taken by the imaging element through the cameral lens,
   wherein a step portion for housing one side portion of the image display device is formed in the lens barrel from a peripheral surface of the lens barrel to an inside of the lens barrel, perpendicularly to the optical axis, and
   wherein a depth of the step portion in an optical axial direction of the lens barrel is nearly equal to a thickness of the image display device.

* * * * *